(12) United States Patent
Morgan et al.

(10) Patent No.: US 10,875,046 B2
(45) Date of Patent: Dec. 29, 2020

(54) HIGH-PRESSURE SEALING OF SPRAY NOZZLE ASSEMBLIES

(71) Applicant: Spray Nozzle Engineering Pty Limited, Mentone (AU)

(72) Inventors: Sean Morgan, Mentone (AU); Stuart Morgan, Mentone (AU)

(73) Assignee: Spray Nozzle Engineering Pty Limited, Mentone (AU)

( * ) Notice: Subject to any disclaimer, the term of this patent is extended or adjusted under 35 U.S.C. 154(b) by 0 days.

(21) Appl. No.: 16/093,057

(22) PCT Filed: Apr. 11, 2017

(86) PCT No.: PCT/AU2017/050319
§ 371 (c)(1),
(2) Date: Oct. 11, 2018

(87) PCT Pub. No.: WO2017/177267
PCT Pub. Date: Oct. 19, 2017

(65) Prior Publication Data
US 2019/0201930 A1    Jul. 4, 2019

(30) Foreign Application Priority Data
Apr. 11, 2016   (AU) ................................. 2016901340

(51) Int. Cl.
*B05B 15/65*         (2018.01)
*B05B 1/02*          (2006.01)
(Continued)

(52) U.S. Cl.
CPC ................ *B05B 15/65* (2018.02); *B05B 1/02* (2013.01); *F26B 3/12* (2013.01); *A23C 1/04* (2013.01); *B05B 1/3436* (2013.01)

(58) Field of Classification Search
CPC .......... B05B 1/02; B05B 1/3436; B05B 15/65; F26B 3/12
(Continued)

(56) References Cited

U.S. PATENT DOCUMENTS 4,258,925 A * 3/1981 Guyton .................... F16K 15/03
                                                137/527
5,490,680 A * 2/1996 Patel ....................... F16J 15/062
                                                277/608
(Continued)

FOREIGN PATENT DOCUMENTS

WO    WO 2013/059882 A1    5/2013

OTHER PUBLICATIONS

International Examining Authority, International Preliminary Report on Patentability (Chapter II) for International Application No. PCT/AU2017/050319, dated Aug. 21, 2018, 3 pages, Australian Patent Office, Australia.
(Continued)

*Primary Examiner* — Darren W Gorman
(74) *Attorney, Agent, or Firm* — Alston & Bird LLP (57) ABSTRACT

A static axial seal gland (100, 100) formed in relief in a substrate (31, 52) and having an inner sidewall (32, 53), an outer sidewall (33, 54) and a floor (34, 55) extending between the inner sidewall (32, 53) and the outer sidewall, one or both of the inner sidewall (32, 53) and the outer sidewall (32, 53) being concavely-profiled in radial section along a major portion of its depth to define a projecting lip (35, 56) proximal a land of the substrate (31, 52), the gland (100, 100') being fitted with an elastomeric O-ring (39, 59) which is located and retained by interference with the projecting lip (35, 56), either under tension on the inner sidewall (32, 53) or in compression against the outer sidewall (33, 54).

18 Claims, 7 Drawing Sheets

(51) Int. Cl.
  *F26B 3/12*   (2006.01)
  *A23C 1/04*   (2006.01)
  *B05B 1/34*   (2006.01)
(58) Field of Classification Search
  USPC .......................................................... 277/641
  See application file for complete search history.

(56) References Cited

U.S. PATENT DOCUMENTS

| | | |
|---|---|---|
| 5,564,177 A | 10/1996 | Fernandes et al. |
| 9,027,861 B2 * | 5/2015 | Morgan ................ B05B 1/3426 239/600 |
| 2012/0153577 A1 | 6/2012 | Morgan et al. |
| 2014/0048630 A1 * | 2/2014 | Morgan ................ B05B 1/3006 239/589 |
| 2015/0279706 A1 * | 10/2015 | Nakagawa ............. F16J 15/128 277/641 |

OTHER PUBLICATIONS

International Searching Authority, International Search Report and Written Opinion for International Application No. PCT/AU2017/050319, dated Jun. 7, 2017, 7 pages, Australian Patent Office, Australia.
Parker Hannifin Corporation, "Parker O-Ring Handbook ORD 5700", 2007, 50$^{th}$ Anniversary Edition, retrieved from <https://www.sealingdevices.com/documents/ORD%205700%20Parker_O-Ring_Handbook.pdf5> on Oct. 11, 2018.

* cited by examiner

SECTION A-A  FIG 5B

DETAIL B

HIGH-PRESSURE SEALING OF SPRAY NOZZLE ASSEMBLIES

CROSS REFERENCE TO RELATED APPLICATIONS

This application is a National Stage Application, filed under 35 U.S.C. § 371, of International Application No. PCT/AU2017/050319, filed Apr. 11, 2017, which claims priority to Australian Application No. 2016901340, filed Apr. 11, 2016; the contents of both of which as are hereby incorporated by reference in their entirety.

BACKGROUND

Related Field

The present invention relates to industrial spray nozzle assemblies, which are characterised by high-pressure operation for spray drying applications.

Description of Related Art

Spray nozzle assemblies are used in various industrial applications, such as spray drying of dairy milk, for example. These spray nozzle assemblies operate under high pressure (typically in excess of 3,000 psi), and across a range of temperatures.

Spray nozzle assemblies of this type must accordingly be precision engineered to operate under high-pressure conditions with safety and reliability, and also designed for ergonomic use in an industrial setting.

On account of high-pressure operation, spray nozzle assemblies rely upon robust sealing arrangements for safety and performance. There is little constructive design advice available for high-pressure static sealing applications however.

As an example, one trusted and authoritative source for general reference is the Parker O-Ring Handbook ('Parker'), published by Parker Hannifin Corporation, Cleveland, Ohio. Whilst a valuable publication generally, Parker O-Ring Handbook offers little guidance to particular challenges faced in engineering high-pressure static seals in spray nozzle assemblies.

High-pressure spray nozzle assemblies are subject to peculiar challenges as a consequence of their typical operating environment, as mentioned above, as well as constrained geometry and other design and field factors. Moreover, spray drying applications require typically daily service, in contrast with other static axial sealing arrangements having no such maintenance schedule.

There is accordingly a need for improved sealing arrangements suitable for high-pressure spray nozzle assemblies, or at least provide a useful alternative.

BRIEF SUMMARY

The present invention arises from a recognition that design and operational advantages can be realised by using an improved static axial sealing arrangement designed to positively locate and actively retain an O-ring within an O-ring gland having a concavely curved sidewall.

A projecting lip, when fitted with a suitably dimensioned O-ring by interference, locates and retains the O-ring when the spray nozzle assembly is disassembled, which is advantageous for ergonomic handling. Moreover, a radiused profile avoids local stress concentrations, and can assist with efficient cleaning.

Preferred embodiments of the described static axial sealing arrangement are implemented between mating surfaces of a nozzle cap and nozzle body, and also a nozzle cap and tungsten carbide orifice disc.

Tungsten carbide is a high-strength material, but also relatively brittle, and can be sensitive to even minor scratches as a result of localised stress concentrations arising as a consequence of material discontinuities caused by such scratches. Minor toolmarks invisible to the naked eye, or similar wear marks can lead to premature, unexpected failure in strong steels owing to such local stress concentrations.

Spray nozzle assemblies have typical application in dairy or other food-related industries, and require fabrication by CNC machining from food-grade steels, such as 316 grade steel. 316 steel is less ductile (and more brittle) than some other steel grades, such as 304 grade, which can exacerbate the possibility of stress-related failure during pressurised operation.

Meeting engineering standards such as ASME B31.3 relating to pressure stress requirements implies exacting design for high-pressure spray nozzle assemblies, owing to the high pressures involved, the nature of the materials, and relatively small spatial volumes involved in spray nozzle assembly designs.

An improved design for a static axial sealing arrangement features a sidewall which is concavely-profiled along a major portion of its depth for locating and retaining the O-ring by interference with a projecting lip defined by the concave profile.

The O-ring is located and retained under slight tension at the inner sidewall, or alternatively under slight compression against the outer sidewall.

The present invention accordingly provides a static axial seal gland formed in relief in a substrate and having an inner sidewall, an outer sidewall and a floor extending between the inner sidewall and the outer sidewall, one or both of the inner sidewall and the outer sidewall being concavely-profiled in radial section along a major portion of its depth to define a projecting lip proximal a land of the substrate, the gland being fitted with an elastomeric O-ring which is located and retained by interference with the projecting lip, either under tension on the inner sidewall or in compression on the outer sidewall.

The concavely curved profile of the sidewalls advantageously acts to reduce local stress concentrations when a sealing arrangement is pressurised, and can in some designs provide a greater area over which sealing occurs.

DETAILED DESCRIPTION OF VARIOUS EMBODIMENTS

Figures 1A, 1B:
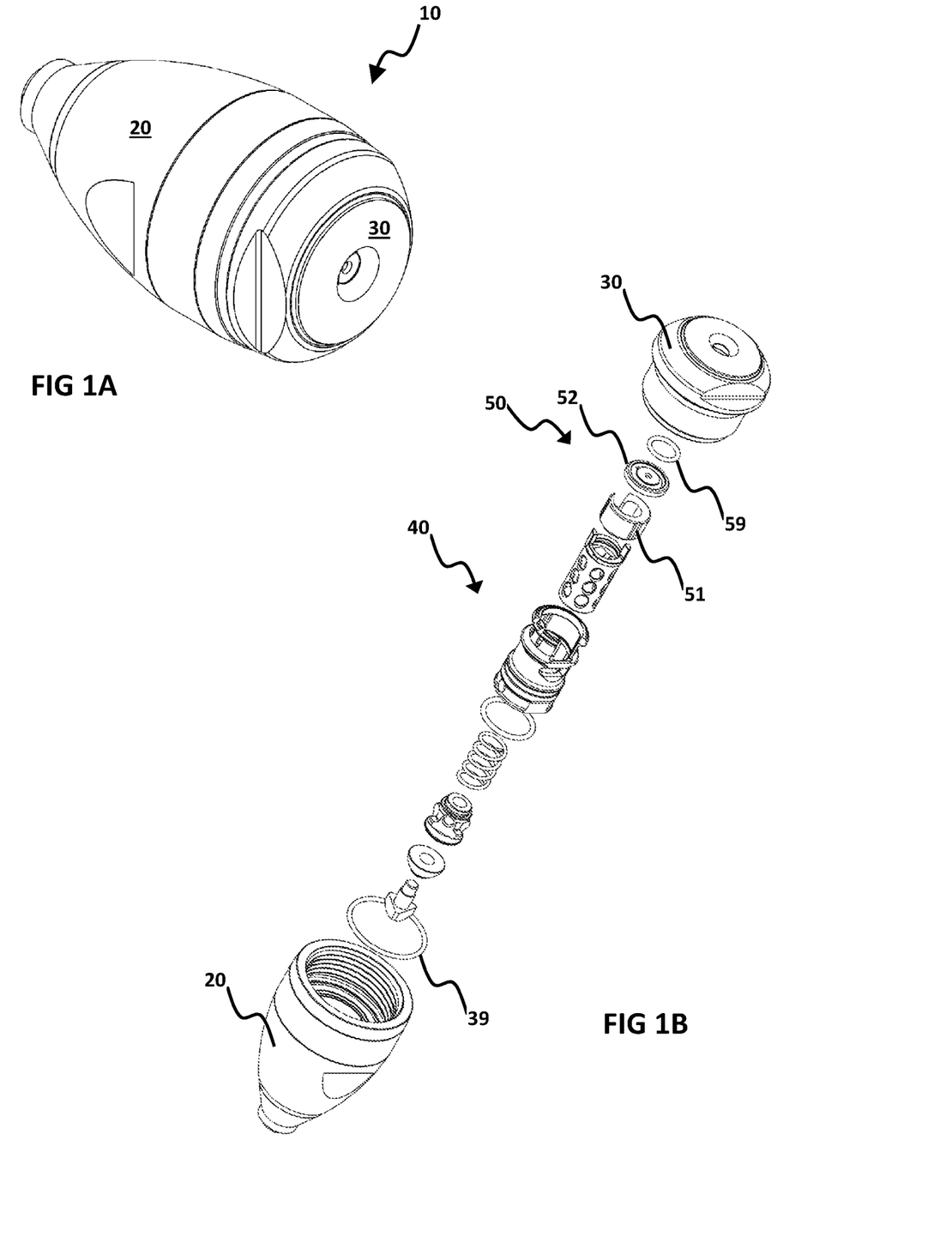
FIGS. 1A and FIG. 1B are isometric views of a high-pressure spray nozzle assembly in assembled and exploded view respectively incorporating preferred embodiments of the present invention.

FIG. 1 depicts assembled and exploded views of a high-pressure spray nozzle assembly 10, of the type under consideration herein. This assembly 10 comprises as principal components a nozzle body 20 and nozzle cap 30 and a removable clasp assembly 40 housed within the nozzle body 20 and nozzle cap 30. The spray nozzle assembly 10 is a modified design of that described and depicted in WIPO publication no WO2013/059882, published 7 Jun. 2012. The content of this application is hereby incorporated by reference in its entirety.

Figure 2A:
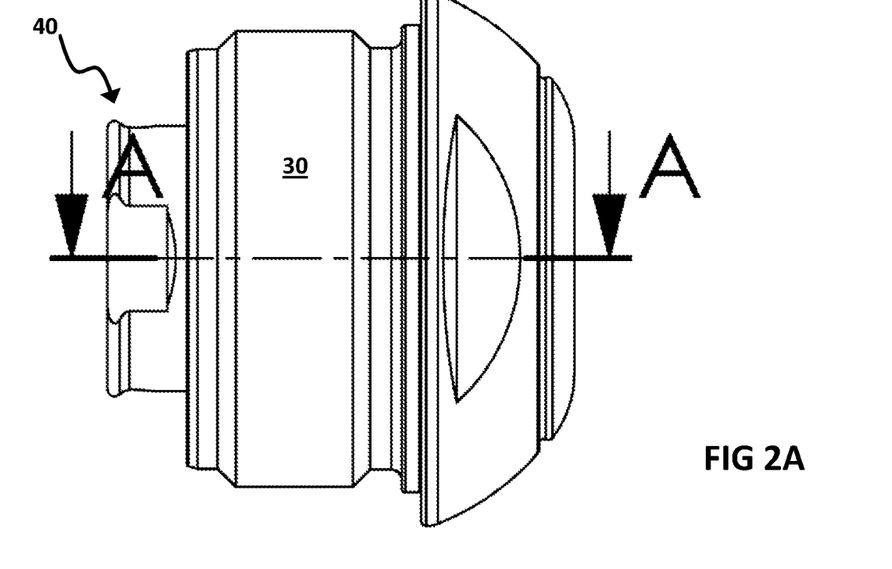
FIGS. 2A and FIG. 2B are respectively a side elevation of a cap and clasp assembly of the FIG. 1, and a corresponding sectional view.
Figure 2B:
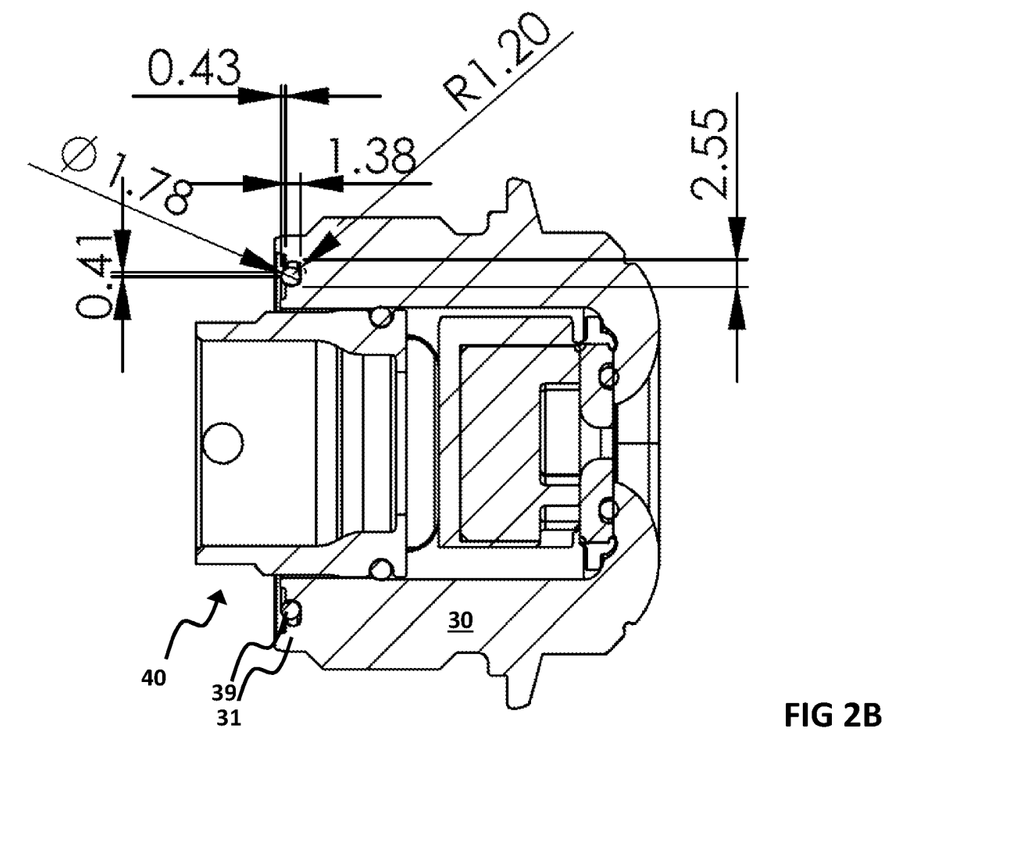

As is apparent in FIGS. 1 and 2, the nozzle body 20 and nozzle cap 30 co-operatively house the removable clasp assembly 40, which is adapted to receive replaceable wear parts 50 in the form of a co-located swirl chamber 51 and orifice disc 52, which seat within the clasp assembly 40. The orifice disc 52 sits atop the swirl chamber 51, and the top of the orifice disc 52 mates (when assembled) against an underside of the nozzle cap 30. A central bore in the orifice disc 52 aligns with a corresponding central bore in the nozzle cap 30, when assembled.

The cap 30 attaches to the body 20 by screw-threaded engagement, and the assembly 10 is in operation connected to a pressurised source of liquid to be sprayed through the spray nozzle assembly, in this case for a spray drying application.

The nozzle cap 30, as depicted, features as part of its sealing arrangement with the nozzle body 20 an annular skirt 31. The annular skirt 31 forms a substrate in which a static axial seal gland 100 is formed in sunk relief as a recess against the surface or land of the annular skirt 31. The land of the annular skirt 31 mates against a corresponding matching surface formed on the nozzle body 20 to effect sealing, providing metal-to-metal contact between the body 20 and cap 30 on both sides of the gland 100. The O-ring 39 compresses within the gland 100 to ensure an effective seal.

The gland 100 features an inner sidewall 32 and an outer sidewall 33, distinguished by proximity with respect to a geometric centre of the circularly-shaped gland 100. The sidewalls 32, 33 have a depth extending to a floor 34. The floor 34 has a width extending between the inner sidewall 32 and outer sidewall 33. The floor 34 is generally flat across its extent, or a major portion of its extent. Corners between the floor 34 and sidewalls 32, 33 are radiused as indicated.

Figure 4:
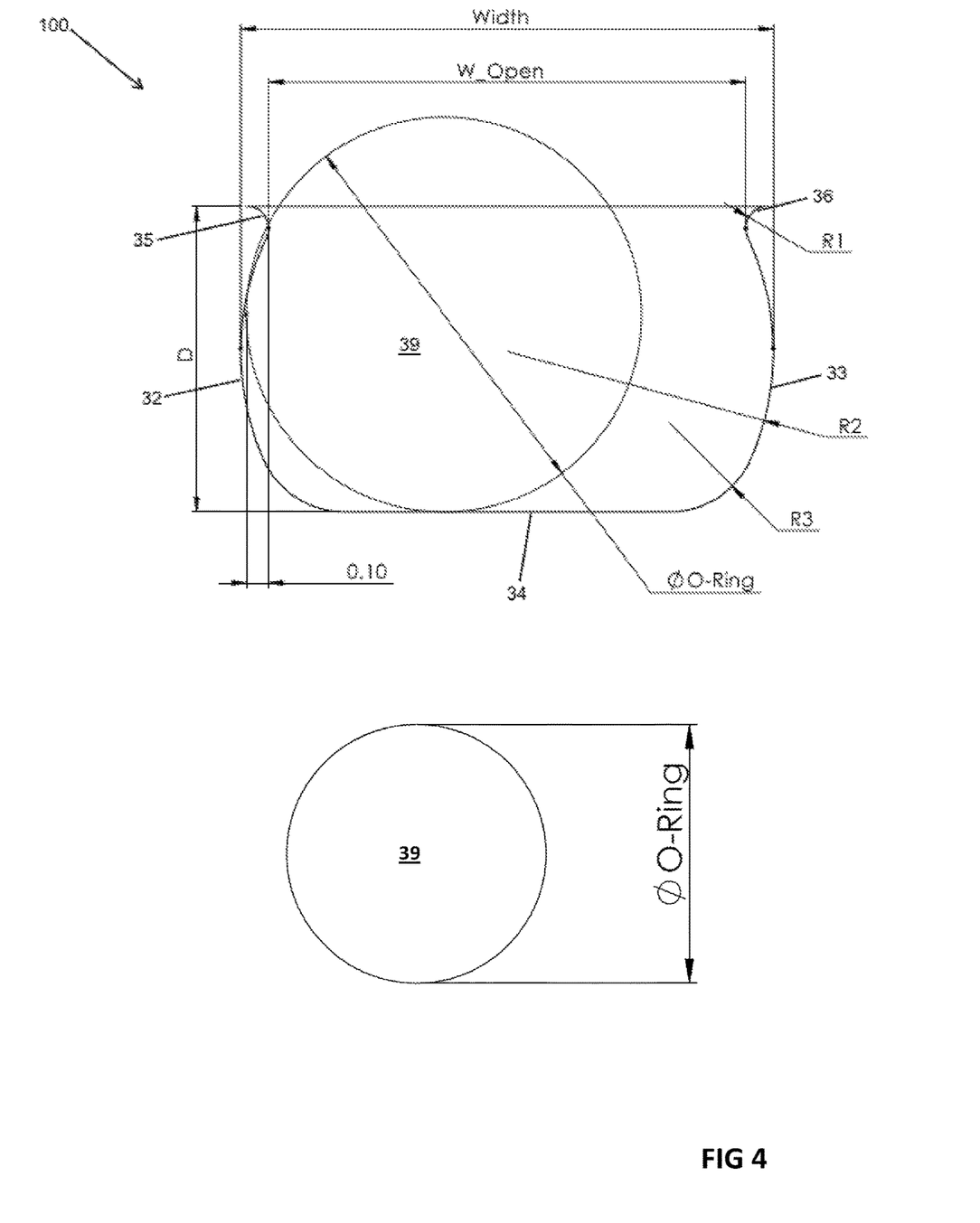
FIG. 4 is a schematic diagram of the geometry of the O-ring gland and associated O-ring of FIG. 3.

The sidewalls 32, 33 are both concavely-profiled, as is evident from the radial section of FIG. 4, along a major portion of their depth. The gland 100 can be thought of as featuring a peripheral recess in each of its sidewalls 32 on account of the concave profile of the sidewalls 32, 33. Conversely, the sidewalls 32, 33 can be thought of as featuring projecting lips 35, 36 proximal the land of the annular skirt 31 adjacent the gland.

The axial gland 100 is, to be clear, formed in recess in the land of the annular skirt 31, and locates and retains the O-ring 39 by interference with the inner projecting lip 35 as seen in FIG. 2B by selection of a suitably dimensioned O-ring 39. The O-ring 39 is accordingly under slight tension. Fitment could conversely be at the outer sidewall 33, with an O-ring (of suitable size) located and retained by interference with the outer projecting lip 36, under slight compression.

Figure 3:
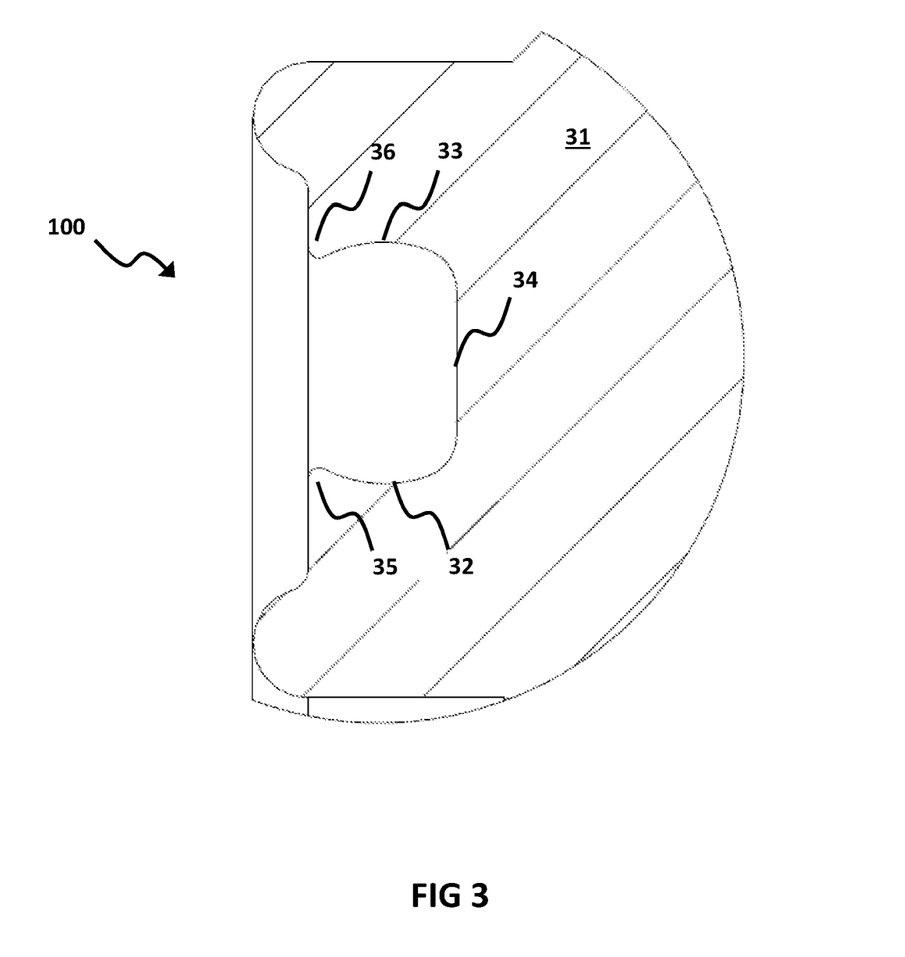
FIG. 3 is a sectional detail of a gland geometry of FIG. 2B.

FIG. 3 depicts in sectional detail the geometry of the O-ring gland 100, with FIG. 4 providing a corresponding schematic representation with an O-ring 39 in situ.

As will be appreciated, the geometry of the O-ring gland 100 in section may be characterised as barrel-shaped owning to the concavely profiled sidewalls 32, 33 of the gland.

More precisely, the geometry of the O-ring gland 100 may be characterised as cauldron-shaped owing to the above-mentioned concaved side walls in combination with the radiused section where the gland meets the land of the annular skirt 31.

The profile of the O-ring gland 100 is symmetrical as depicted—with both sidewalls 32, 33 sharing a common profile.

FIG. 4 depicts an indicate geometry in schematic form. This geometry is characterised by R1, R2 and R3 being different radii of curvature as depicted. R1 indicates a radii of convex curvature where the sidewall 32, 33 meets the land of the annular skirt 31. R2 indicates a concave curvature along a major portion of the sidewalls 32, 33. R3 indicates a concave curvature where the sidewalls 32, 33 meets the floor 34 of the O-ring gland 100.

D is the depth of the gland 100, measured from the land of the skirt 31 to the floor 34. W is the width of the gland 100—at its maximal extent at the shallow of the sidewalls 32, 33 where R2 is indicated. W_Open is the width of the gland 100 at its minimal extent, at its throat where R1 is indicated. O_Ring is the diameter of the O-ring 39, which is depicted fitted in the gland 100, and also separately for reference.

As depicted, the profile of the sidewalls 32, 33 is gradually and continually curved, so that the profile is serpentine in shape, and has no sharp transitions. This configuration assists cleaning at regular service, and avoids local stress concentrations. On both sidewalls 32, 33, there is a gradual and smooth transition between the surface of the land, which curves downwardly and inwardly into the gland 100, defined by a first radius R1, and then transitions inwardly in a concave section defined by a second radius R2, then transitions to a third radius, which transitions to a floor 34 of the O-ring gland 100.

TABLE 1 below outlines these geometrical relations between different measures.

TABLE 1

W = D * 1.6304347826
R2 = R1 * 12
R3 = R1 * 4    →    R2 = R3 * 3
D = O-Ring /1.28985507246
R1 = O_Ring * 0.05617977528
O_Ring = R1 * 17.8    →    O_Ring
W_Open = O_Ring / 0.82790697674

The metrics outlined in connection with TABLE 1 present an indicative set of geometric parameters and relations that can be used as a design reference. As will be appreciated by those in the art, the proportions and geometric relations outlined in TABLE 1 above and FIG. 4 can be modified considerably while maintaining the advantages of this design geometry.

As is apparent from FIGS. 3 and 4, the open neck (W_Open) of the gland 100 is greater than the diameter of the O-ring 39, which in any case is typically under slight tension. This permits a small clearance for the O-ring 39 to be conveniently removed, which as with a tool or even manually using a fingernail. The O-ring 39 does not fall out as it is located and retained within the gland 100 by interference with the curved inner projecting lip 35.

Manufacturing tolerances of the specified O-ring 39 and the machined gland 100 should be part of design consideration so that the O-ring 39 will have a suitable margin for full accommodation within the gland 100.

The diameter of the O-ring 39 is selected to be approximately 20% greater than the depth of the O-ring gland 100, to permit compression during operation. As indicated in FIG. 3, there is a 0.1 mm interference at the O-ring diameter, which represents an interference which is preferably though not necessarily presented to a high-pressure side of the seal arrangement. The diameter of the O-ring 39 is such that it presents a stronger curvature than the second radius (R2) defining a major portion of the inner sidewall 32 against which the O-ring 39 fits.

The preferred material of the seal 39 is VITRON® Duro 75 or 90, a specification of elastomer which is a trade name for DuPont-Dow Elastomers Fluorocarbon or FKM material. This specification of seal material relatively high level of fluorine provides resistance to a wide variety of chemicals, which is desirable in the typical conditions used for spray drying.

Figure 5A:
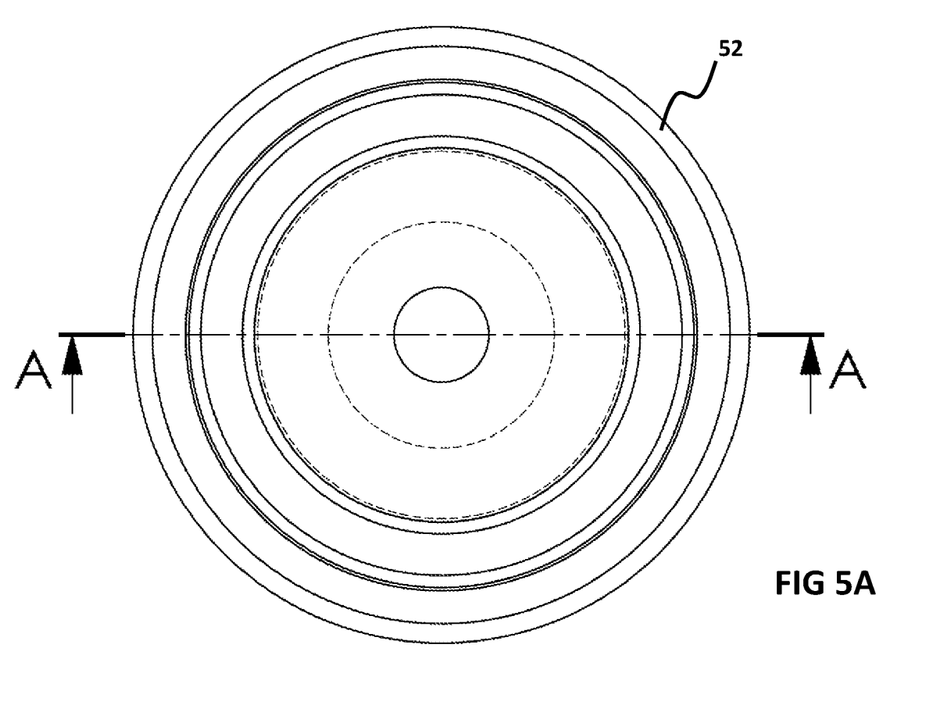
FIGS. 5A and FIG. 5B are respectively a plan of a tungsten carbide orifice disc embodied in the high-pressure spray assembly of FIGS. 1 and 2, and a corresponding sectional view.
Figure 5B:
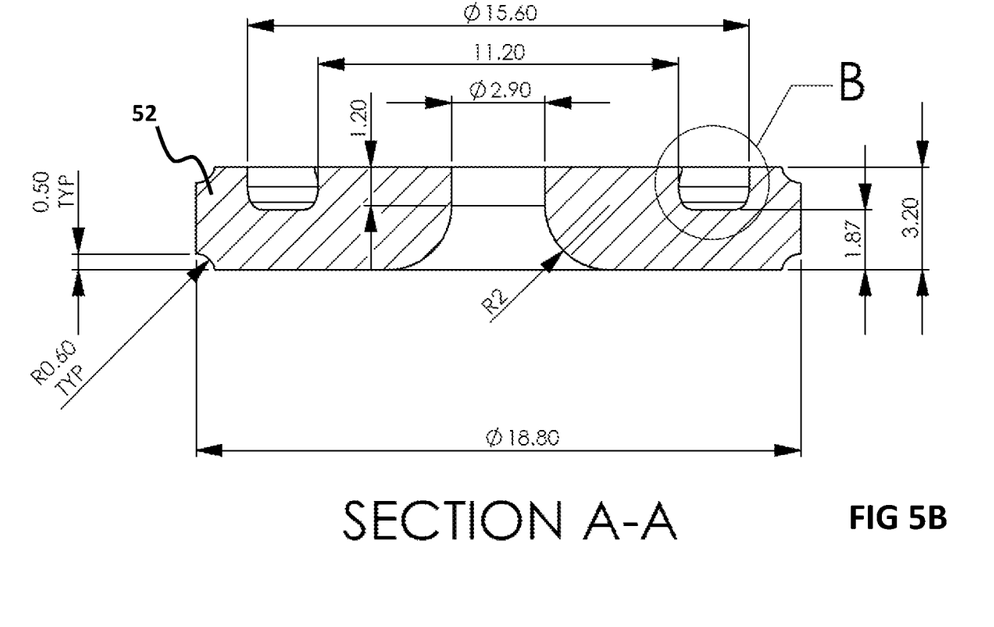
Figure 6:
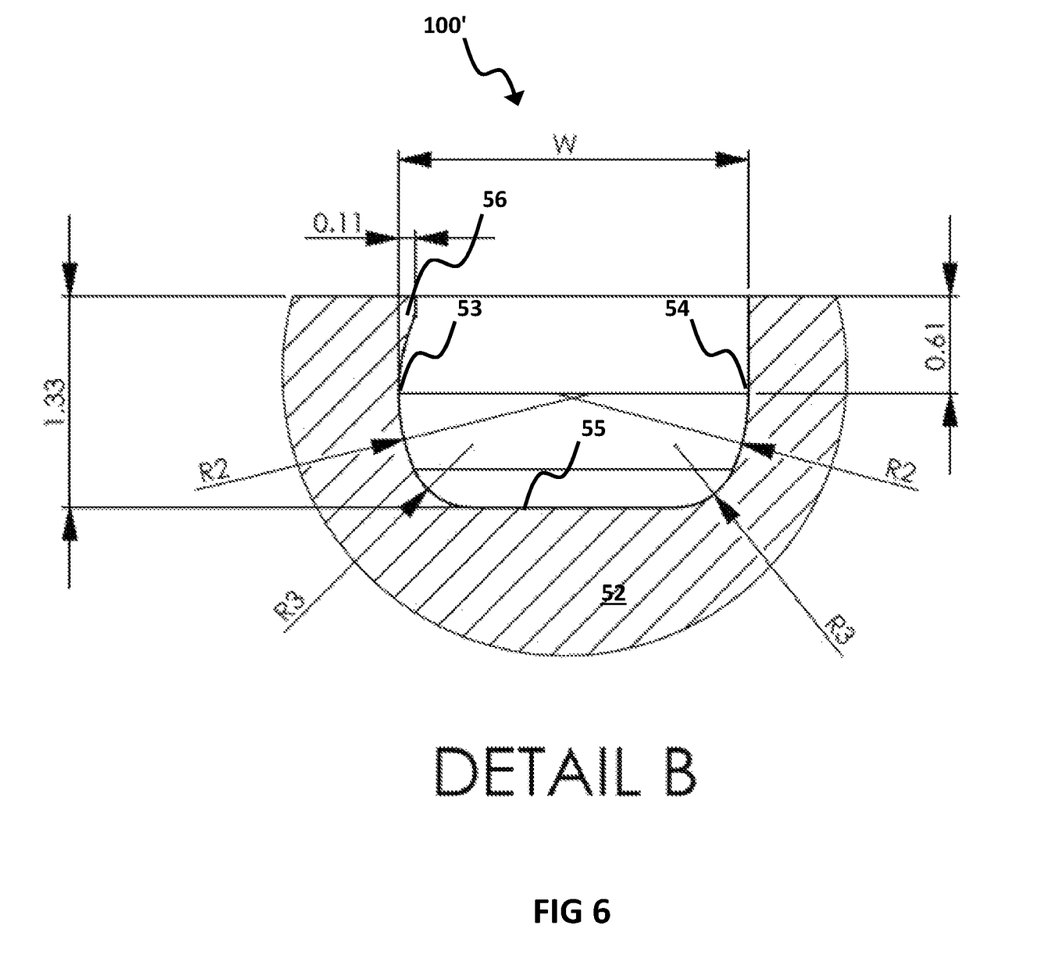
FIG. 6 depicts is a detail of a gland geometry of FIG 5.
Figure 7A:
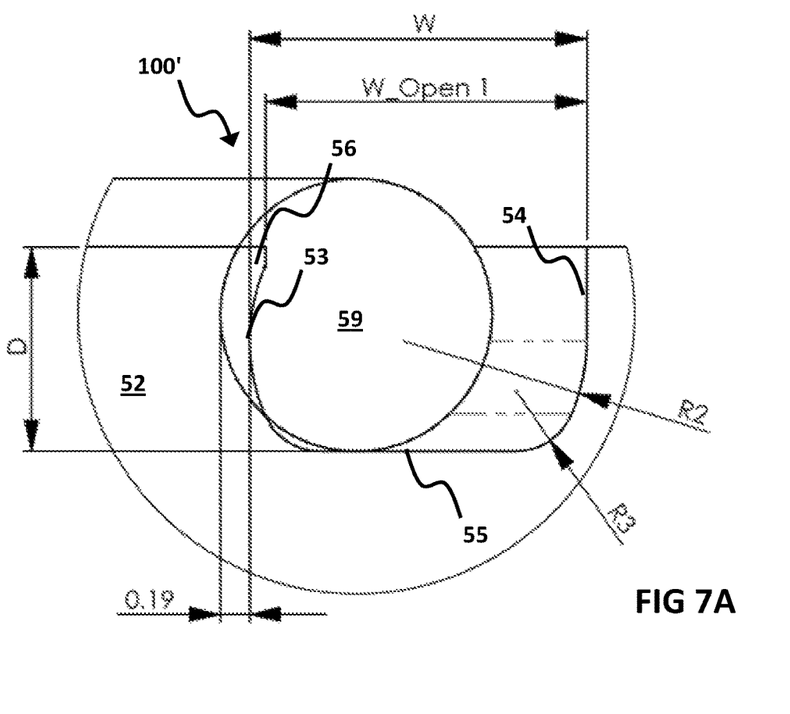
FIGS. 7A and 7B are schematic diagrams of alternative geometries of the O-ring gland and associated O-ring of FIG. 6.
Figure 7B:
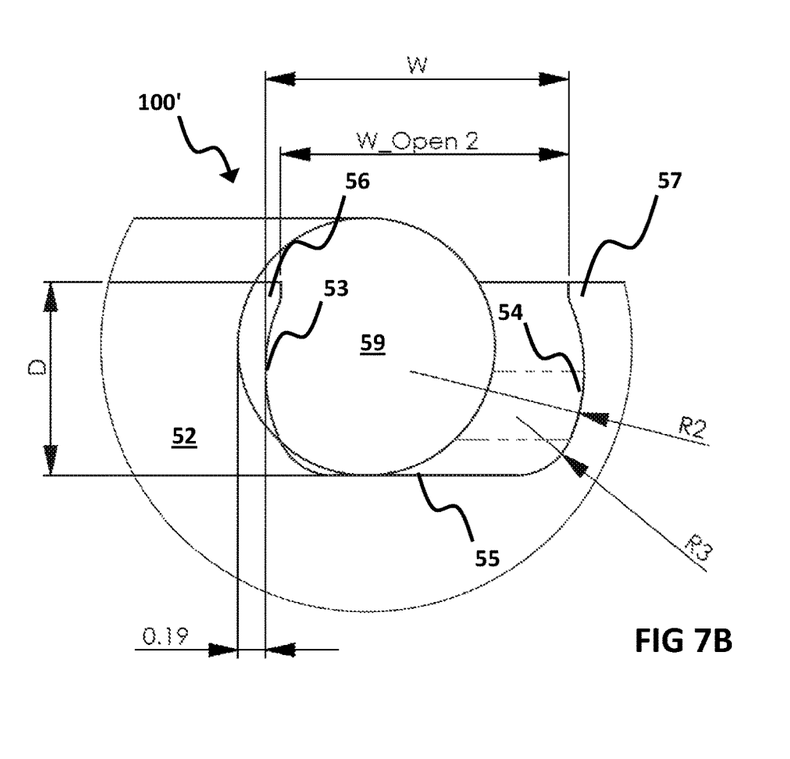

FIGS. 5, 6 and 7 present a further illustrative sealing arrangement by way of a static axial sealing gland 100' formed in a top of orifice disc 52 of the wears parts 50 for sealing against an underside of the nozzle cap 30. Many similar considerations apply with the gland 100 formed in the annular skirt 31 of the cap 30, as described above in connection with the drawings, and a similar geometry is used with some differences as indicated.

The gland 100' features sidewalls 53, 52 having a depth and descending from the land of the orifice disc 52 to a floor 55 having a width. As is evident in FIG. 6, only an inner sidewall 53 is concavely profiled, with an inner projecting lip 56 locating and retaining O-ring 59, as indicated in FIG. 7A. The outer sidewall 54 is not so profiled for retaining an O-ring, though is radiused as indicated towards the floor 55 of the gland 100'. The inner projecting lip 56 is not curved but flat as indicated. FIG. 7B presents an alternative geometry to that of FIG. 7A, in which both inner and outer sidewalls 53, 54 are concavely profiled. O-ring 59 is still retained in the inner lip 56, though a different design could permit location and retention instead on the outer lip 57.

TABLE 2 below outlines some geometrical relations of this O-ring gland 100'.

TABLE 2

W = D * 1.65413533834
R2 = R3 * 3
D = O-Ring /1.33834586466
W_Open1 = O_Ring / 0.849985906230882
W_Open2 = O_Ring / 0.895235043583487

The metrics outlined in connection with TABLE 2 present an indicative set of geometric parameters and relations that can be used as a design reference. As will be appreciated, with respect to both exemplary glands 100, 100' described and depicted, various modifications may be made by those skilled in the art within the spirit and scope of the present invention.

The invention claimed is:

1. A static axial seal gland formed in relief in a substrate and comprising:
 an inner sidewall of a first length and having a first end and a second end opposing the first end,
 an outer sidewall of a second length and having a first end and a second end opposite the first end, and
 a floor extending between the first end of the inner sidewall and the first end of the outer sidewall, respective intersections of the floor with the first end of the inner sidewall and the first end of the outer sidewall each having a concave radius of curvature, the concave radius of curvature for each respective intersection being the same and configured to define a continually curved profile of the floor, the inner sidewall, and the outer sidewall,
 wherein:
 at least one of the inner sidewall or the outer sidewall are further concavely-profiled in radial section along a major portion of the first length of the inner sidewall or the second length of the outer sidewall, so as to define a projecting lip proximal a land of the substrate and the second ends of the inner and outer sidewalls.

2. A high-pressure spray nozzle assembly comprising:
 a nozzle cap, and
 a nozzle body,
 wherein the nozzle cap and the nozzle body are removably attached to each other and operatively sealed at a junction of opposed surfaces of the nozzle cap and nozzle body by the static axial seal gland according to claim 1.

3. A high-pressure spray nozzle assembly comprising:
 a nozzle cap,
 a nozzle body, and
 a housing,
 wherein the nozzle cap and the nozzle body are removably attached to each other, and
 the housing is a wear part operatively sealed against an underside of the nozzle cap by the static axial seal gland according to claim 1.

4. A tungsten carbide wear part for a high-pressure spray nozzle assembly having formed in a face thereof the static axial seal gland according to claim 1.

5. The static axial seal gland according to claim 1, wherein the concave radius of curvature of the intersection with the floor is approximately ⅓ a radius of curvature of the concavely-profiled major portion of the inner and/or outer sidewalls.

6. The static axial seal gland according to claim 1, wherein the first length of the inner sidewall is the same as the second length of the outer sidewall, collectively defining a depth of the static axial seal gland.

7. The static axial seal gland according to claim 1, wherein a distance between the second ends of the inner and outer sidewalls proximate the projecting lip is greater than a length of the floor and defines an opening width.

8. The static axial seal gland according to claim 1, wherein the major portion of the first length of the inner sidewall or the second length of the outer sidewall defines a total width of the gland.

9. The static axial seal gland according to claim 8, wherein the total width of the gland is between 1.5 and 2.0 times a depth of the gland, the depth of the gland being defined by one or more of the first length of the inner sidewall or the second length of the outer sidewall.

10. The static axial seal gland according to claim 1 wherein:
 a distance between the second ends of the inner and outer sidewalls proximate the projecting lip is greater than a length of the floor and defines an opening width;

the major portion of the first length of the inner sidewall or the second length of the outer sidewall defines a width of the gland; and the opening width is less than the width of the gland and greater than the length of the floor.

11. The static axial seal gland according to claim 10, wherein the width of the gland is between 1.5 and 2.0 times a depth of the gland, the depth of the gland being defined by one or more of the first length of the inner sidewall or the second length of the outer sidewall.

12. The static axial seal gland according to claim 1, wherein the gland is fitted with an elastomeric O-ring, which is located and retained by interference with the projecting lip, either under tension on the inner sidewall or in compression against the outer sidewall.

13. The static axial seal gland according to claim 12, wherein:
   a distance between the second ends of the inner and outer sidewalls proximate the projecting lip is greater than a length of the floor and defines an opening width; and
   the opening width is between 1.10 and 1.25 times the size of a diameter of the elastomeric O-ring, such that the elastomeric O-ring does not simultaneously contact both the inner sidewall and the outer sidewall.

14. A static axial seal gland formed in relief in a substrate and comprising:
   an inner sidewall of a first length and having a first end and a second end opposing the first end,
   an outer sidewall of a second length and having a first end and a second end opposite the first end, and
   a floor extending between the inner sidewall and the outer sidewall,
   wherein:
      at least one of the inner sidewall or the outer sidewall are concavely-profiled in radial section along a major portion of the first length of the inner sidewall or the second length of the outer sidewall, so as to define a projecting lip proximal a land of the substrate and the second ends of the inner and outer sidewalls, and
      the first length of the inner sidewall is the same as the second length of the outer sidewall, collectively defining a depth of the static axial seal gland.

15. The static axial seal gland according to claim 14, wherein:
   the major portion of the first length of the inner sidewall or the second length of the outer sidewall defines a total width of the gland; and
   the total width of the gland is between 1.5 and 2.0 times a depth of the gland, the depth of the gland being defined by one or more of the first length of the inner sidewall or the second length of the outer sidewall.

16. The static axial seal gland according to claim 14, wherein:
   a distance between the second ends of the inner and outer sidewalls proximate the projecting lip is greater than a length of the floor and defines an opening width;
   the major portion of the first length of the inner sidewall or the second length of the outer sidewall defines a width of the gland;
   the opening width is less than the width of the gland and greater than the length of the floor; and
   the width of the gland is between 1.5 and 2.0 times a depth of the gland, the depth of the gland being defined by one or more of the first length of the inner sidewall or the second length of the outer sidewall.

17. The static axial seal gland according to claim 14, wherein the gland is fitted with an elastomeric O-ring, which is located and retained by interference with the projecting lip, either under tension on the inner sidewall or in compression against the outer sidewall.

18. The static axial seal gland according to claim 17, wherein:
   a distance between the second ends of the inner and outer sidewalls proximate the projecting lip is greater than a length of the floor and defines an opening width; and
   the opening width is between 1.10 and 1.25 times the size of a diameter of the elastomeric O-ring, such that the elastomeric O-ring does not simultaneously contact both the inner sidewall and the outer sidewall.

\* \* \* \* \*